United States Patent
Dawes et al.

(12) 
(10) Patent No.: US 8,220,851 B1
(45) Date of Patent: Jul. 17, 2012

(54) TIRE LIFTING APPARATUS AND ASSOCIATED METHOD

(76) Inventors: Brent Dawes, Powderly, TX (US); Shelby Dawes, Powderly, TX (US)

( * ) Notice: Subject to any disclaimer, the term of this patent is extended or adjusted under 35 U.S.C. 154(b) by 497 days.

(21) Appl. No.: 12/380,328

(22) Filed: Feb. 26, 2009

(51) Int. Cl.
*B60C 25/04* (2006.01)

(52) U.S. Cl. .......................... 294/15; 157/1.3

(58) Field of Classification Search .............. 294/15, 294/26, 17; 157/1.3, 1.17; 254/131; 29/273; 414/428
See application file for complete search history.

(56) References Cited

U.S. PATENT DOCUMENTS

| | | | | |
|---|---|---|---|---|
| 1,377,014 | A | * | 5/1921 | Juelfs .......................... 254/131 |
| 1,549,042 | A | * | 8/1925 | Masters ....................... 172/371 |
| 2,027,009 | A | * | 1/1936 | Wyscaver ..................... 81/15.9 |
| 2,207,443 | A | * | 7/1940 | Schneider ..................... 29/273 |
| 2,344,704 | A | * | 3/1944 | Krantz ......................... 157/1.3 |
| 2,539,711 | A | * | 1/1951 | Varabeau ..................... 254/131 |
| 3,134,574 | A | * | 5/1964 | Reuterfors .................. 254/131 |
| 4,183,503 | A | * | 1/1980 | Ward ........................... 254/131 |
| 4,256,430 | A | | 3/1981 | Pugel |
| 4,602,415 | A | | 7/1986 | Garcia |
| 4,949,448 | A | | 8/1990 | Hebnes |
| 5,022,133 | A | | 6/1991 | Weitekamp |
| 5,176,487 | A | | 1/1993 | Flitton |
| 5,180,141 | A | | 1/1993 | Hunt |
| 5,201,559 | A | * | 4/1993 | Boring et al. ................. 294/26 |
| 5,447,289 | A | * | 9/1995 | Callahan ...................... 254/131 |
| 5,479,692 | A | | 1/1996 | Barkus |
| 5,562,389 | A | | 10/1996 | Mitchell |
| 5,581,866 | A | | 12/1996 | Barkus |
| 5,897,171 | A | | 4/1999 | Seifert |
| D412,271 | S | * | 7/1999 | Kliskey .......................... D8/31 |
| 6,298,535 | B1 | | 10/2001 | Lower |
| 6,360,826 | B1 | * | 3/2002 | Barber ......................... 172/371 |
| 7,207,764 | B1 | | 4/2007 | Snook |
| 7,866,365 | B2 | * | 1/2011 | Ochoa .......................... 157/1.3 |

FOREIGN PATENT DOCUMENTS

DE 19738820 * 3/1999

* cited by examiner

*Primary Examiner* — Paul T Chin (57) ABSTRACT

The tire lifting apparatus may comprise an elongated shaft having a handle formed at a proximal end thereof and further having a generally C-shaped prong formed at a distal end of the shaft. An arm preferably traverses the distal end of the shaft and is juxtaposed adjacent to said prong for balancing the wheel/tire along a diametrical face thereof. Both the shaft and the arm preferably have planar top and bottom faces for supporting the wheel/tire thereon.

1 Claim, 9 Drawing Sheets

TIRE LIFTING APPARATUS AND ASSOCIATED METHOD

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to lifting implements and, more particularly, to a tire lifting apparatus for supporting and lifting an existing wheel or tire.

2. Prior Art

Wheel lifting tools and wheel jacks are used to assist operators in lifting and removing wheels or wheel-tire assemblies from vehicle axles. Conventional wheel lifting tools are inefficient because they require a significant force to be exerted by the operator to manipulate truck tires or other heavy tires and leave unsolved the problems of manipulating a heavy wheel-tire assembly after separation from the vehicle axle.

Partial solutions to the problems of removal, manipulation and replacement of heavy wheel-tire assemblies have called for the use of lifts which introduce the use of a foot pedal to lift the tire to the appropriate height so it can be replaced. Other solutions require the use of an operator's hands to lift the wheel, which puts a potentially injurious strain on the operator's back, in addition to causing a user's hands to become soiled. Another remaining problem, however, is that these prior art examples are not effective methods for removing or lifting wheel-tire assemblies which are extremely heavy, such as those used on heavy transport vehicles including trucks.

Another difficulty unsolved by prior approaches is that of maneuvering a heavy wheel for replacement onto an axle. The wheel usually lies flat on the ground or on a work area after being repaired and must be lifted to a vertical position. This also strains the operator's back when performed manually. In removing or replacing a wheel from a truck axle manually, the operator also runs the risk of entrapping his hands between the wheel and the axle.

Related problems also exist with removing and installing wheel-tire assemblies in conventional automobiles. But such problems are especially acute with trucks because of the bulk and weight of wheel-tire assemblies. Also, truck designs in use today complicate the removal of a tire therefrom because the wheel-tire assembly must be lifted so that it can be pulled off the axle. This contrasts with automobile wheels when the wheel-tire assembly can more readily be removed from the axle once the lug nuts are removed. Obviously, it would be advantageous to provide users with a means for safely and easily lifting and manipulating wheel assemblies of varying sizes.

Accordingly, the present invention is disclosed in order to overcome the above noted shortcomings. The tire lifting apparatus is convenient and easy to use, lightweight yet durable in design, and designed for conveniently supporting and lifting an existing wheel or tire. The apparatus is simple to use, inexpensive, and designed for many years of repeated use.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art.

The apparatus of this invention is referred to generally in the figures and is intended to provide a tire lifting apparatus 10, 10'. It should be understood that the apparatus 10, 10' may be used to lift many different types of tires and wheels and should not be limited to lifting only those types of tires and wheels mentioned herein.

Referring initially to FIGS. 1-13 as a whole, the tire lifting apparatus 10, 10' preferably includes an elongated and rigid shaft 20, 20' having a handle 21, 21' directly and statically coupled to a proximal end 22, 22' thereof. The shaft 20, 20' also has a prong 23, 23' directly and statically coupled to a distal end 48, 48' thereof. The shaft 20, 20' may further have rectilinear proximal portion 28, 28' directly and statically coupled to said handle 21, 21' and axially extending away therefrom. Such a proximal portion 28, 28' may be monolithically formed with said proximal end 22, 22' and said handle 21, 21' respectively. The shaft 20, 20' may further have a rectilinear distal portion 24, 24' monolithically formed with said proximal portion 28, 28' as well as said distal end 48, 48' such that said distal portion 24, 24' is intermediately positioned between said proximal portion 28, 28' and said distal end 48, 48' respectively. Advantageously, the prong 23, 23' is axially offset from said distal end 48, 48' of said shaft 20, 20' such that said prong 23, 23' terminates at a first plane spaced apart from said distal end 48, 48'. Also, said shaft 20, 20' preferably has planar top and bottom surfaces for receiving and balancing the tire/wheel 11 thereon.

Now referring to FIGS. 1-6, a first embodiment 10 of the tire lifting apparatus preferably comprises an elongated and rectilinear shaft 20 having a handle 21 formed at a proximal end 22 thereof and further having a curvilinear prong 23 formed at a distal end thereof. Prong 23 may be generally C-shaped wherein it has a linear segment 50 protruding orthogonally to shaft 20. The prong 23 also includes a substantially linear arm 25 may traverse the distal end 48 of the shaft 20 for balancing the wheel/tire 11 along a diametrical face thereof. The prong 23 preferably has a recessed arcuate end disposed posterior to a longitudinal length of shaft 20 for ensuring a secure and stable grip is maintained with the wheel/tire 11 after the prong 23 is inserted therein.

Both the shaft 20 and the arm 25 preferably have planar top and bottom faces for receiving and supporting the wheel/tire 11 thereon. The arm 25 and prong 23 of the apparatus 10 may advantageously be coated with a non-slip material, thereby ensuring that the wheel/tire 11 is protecting from scratching or other damage.

The arm 25 may include a finger 29 that extends outwardly from the shaft 20 in such a manner that is oriented parallel to linear segment 50. The spatial distance between finger 29 and linear segment 50 is preferably fixed and suitably arrange for corresponding to a spatial distance between orifices formed in a tire rim, for example. Thus, the linear segment 50 is inserted into one orifice while finger 29 is inserted into a diametrically opposing orifice of the wheel/tire 11 and thereby permitting the user to easily lift the wheel/tire 11 upwardly from a flat and lowered position on the ground.

Figure 1:
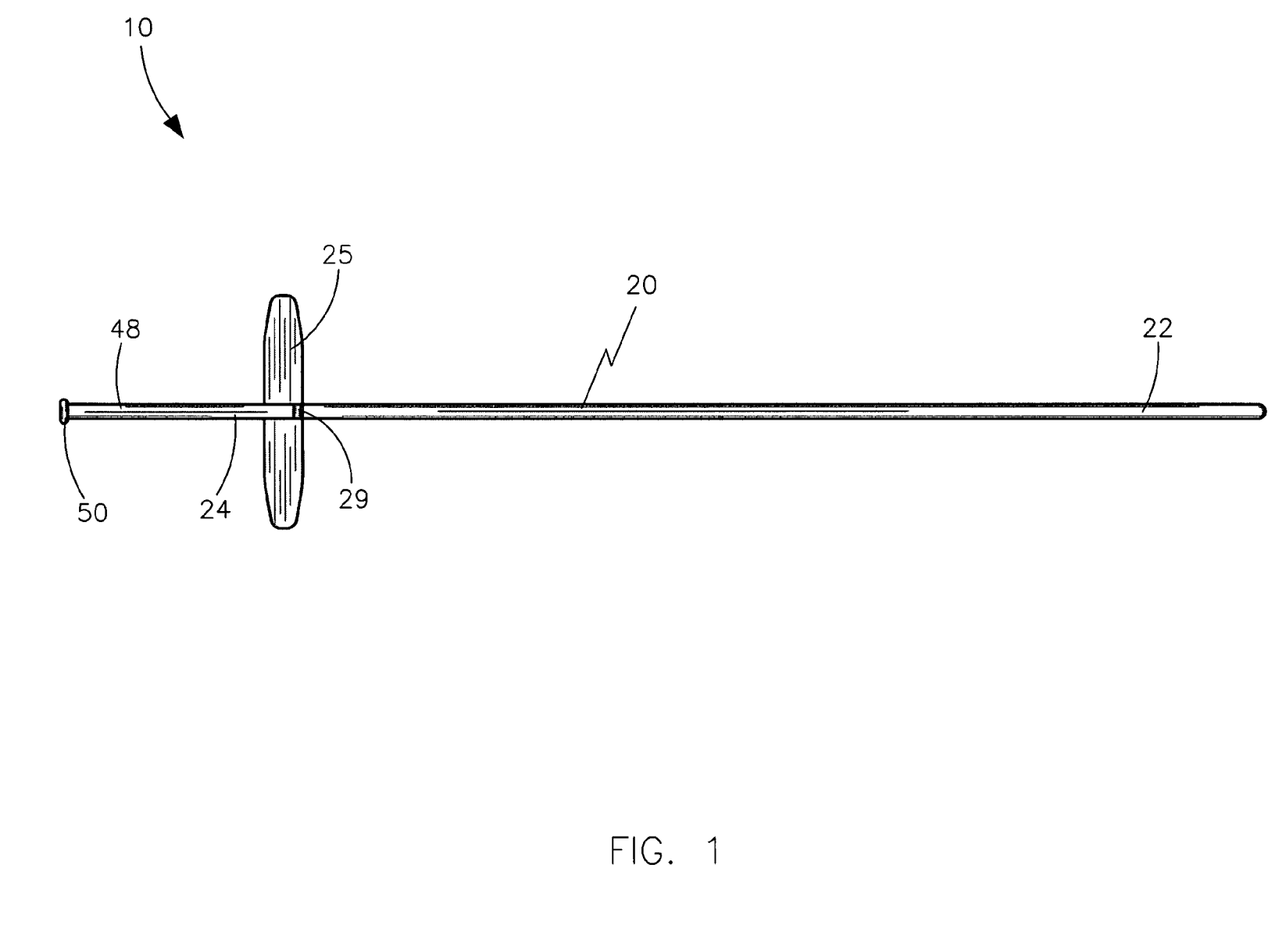
FIG. 1 is a rear elevational view of the tire lifting apparatus, in accordance with a first embodiment of the present invention.
Figure 2:
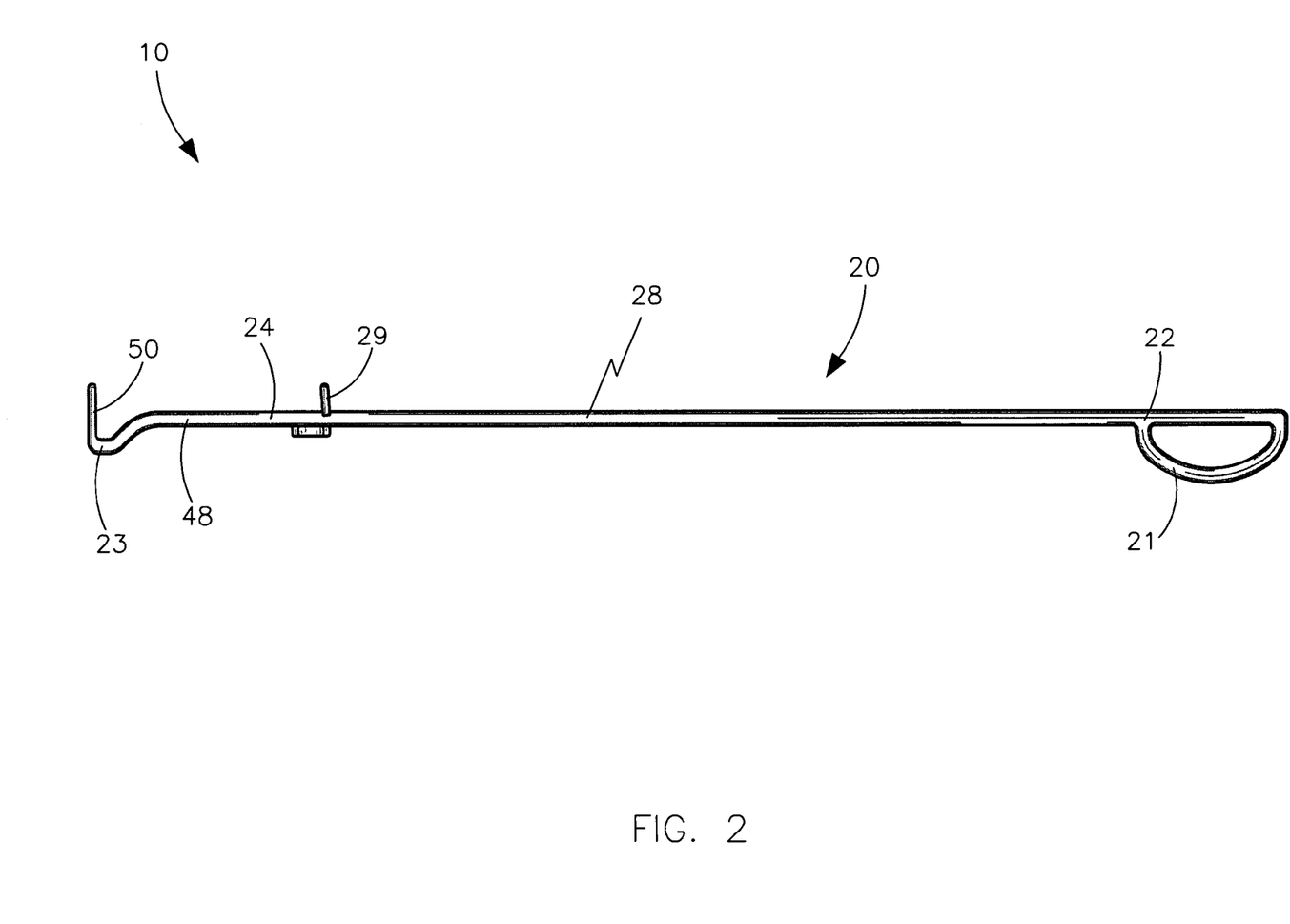
FIG. 2 is a side elevational view of the tire lifting apparatus, as seen in FIG. 1.
Figure 3:
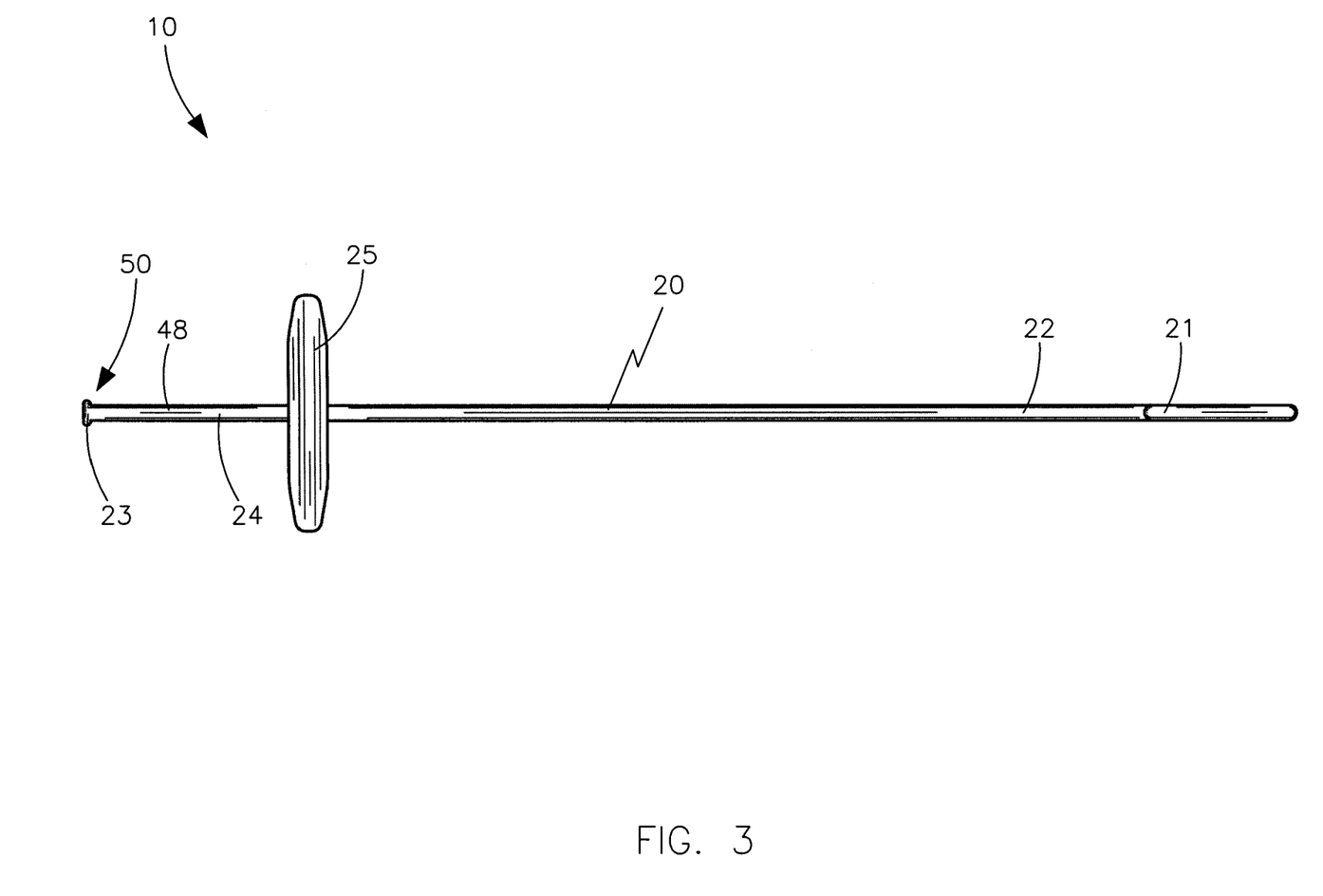
FIG. 3 is a front elevational view of the tire lifting apparatus, as seen in FIG. 1.
Figure 4:
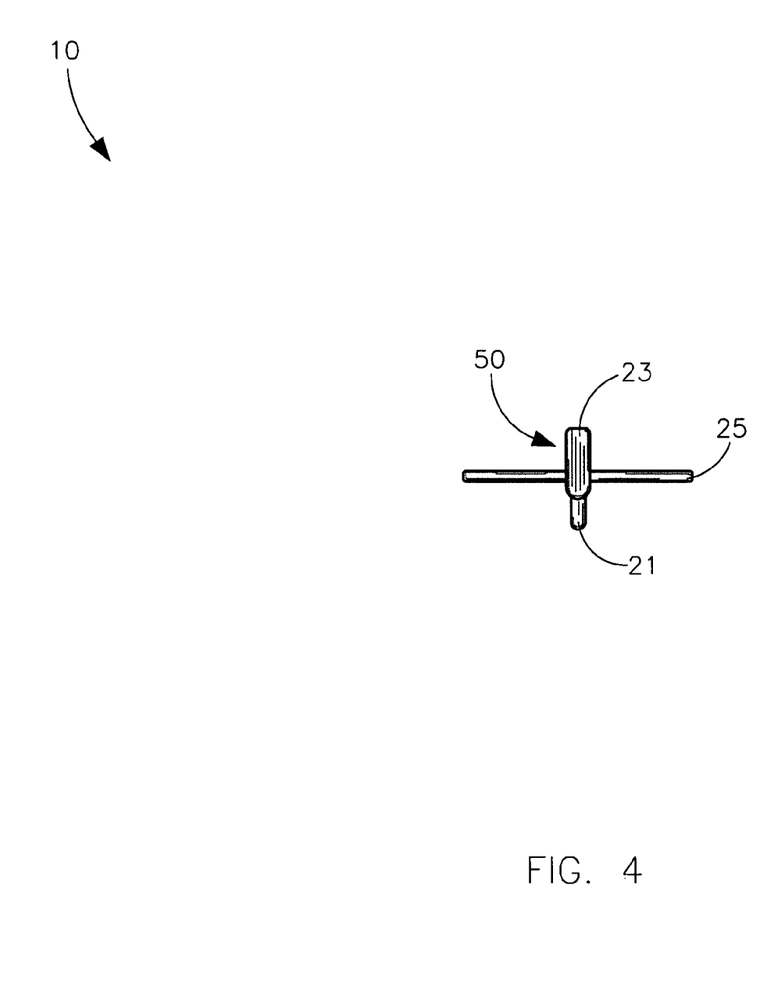
FIG. 4 is a bottom planar view of the tire lifting apparatus, as seen in FIG. 1.
Figure 5:
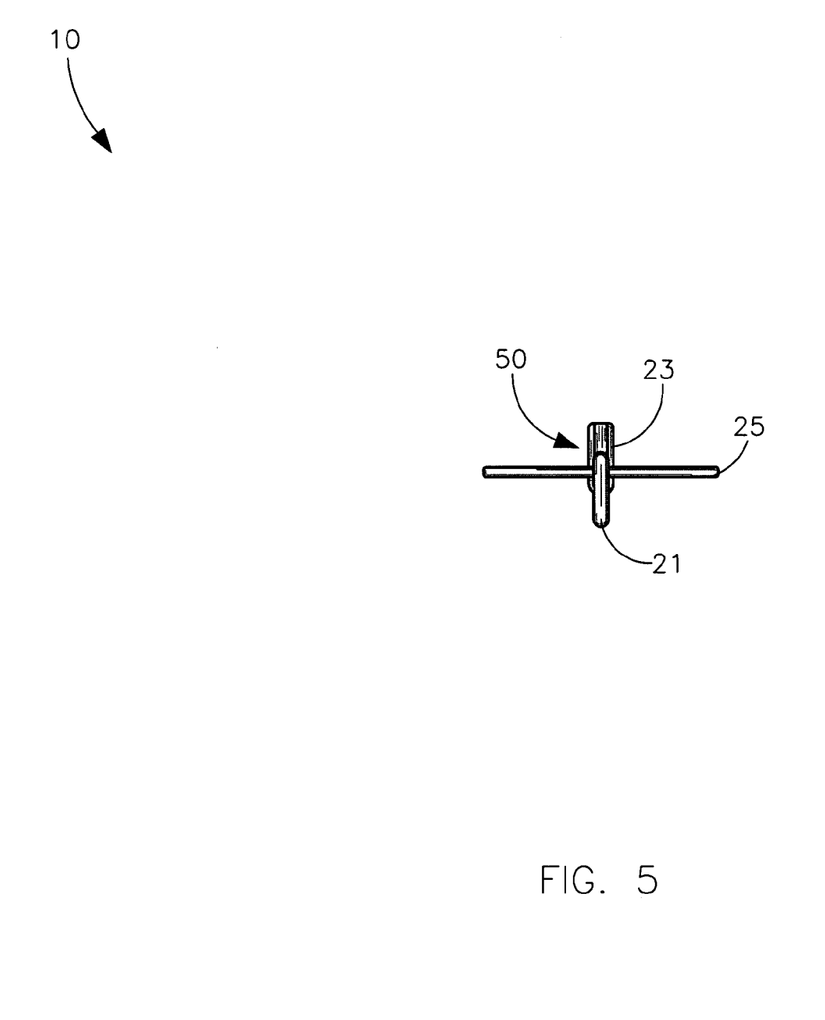
FIG. 5 is a top planar view of the tire lifting apparatus, as seen in FIG. 1.
Figure 6:
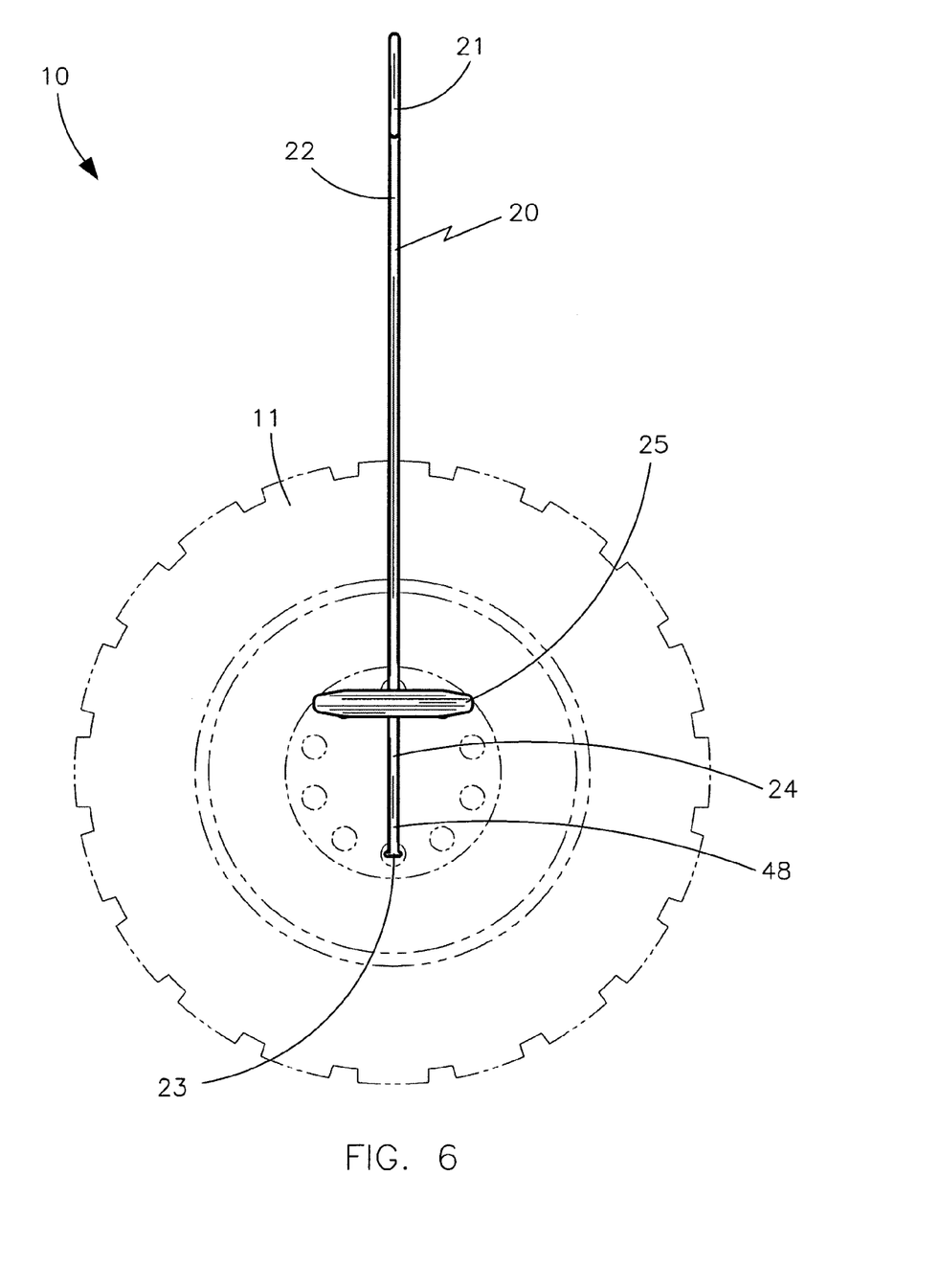
FIG. 6 is a front elevational view of the first embodiment, properly situated within an existing wheel.
Figure 7:
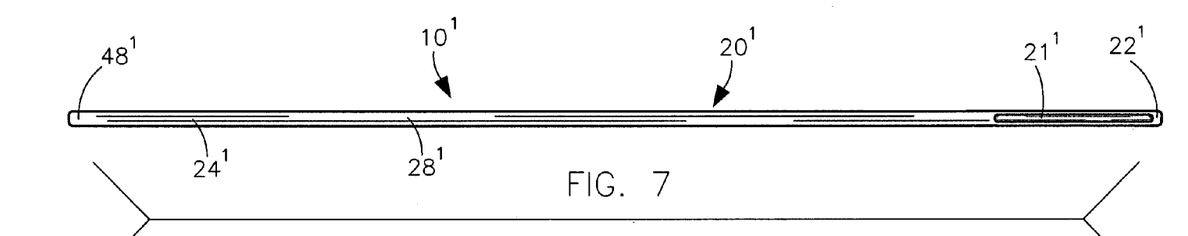
FIG. 7 is a top plan view of the tire lifting apparatus, in accordance with an alternate embodiment of the present invention.
Figure 8:
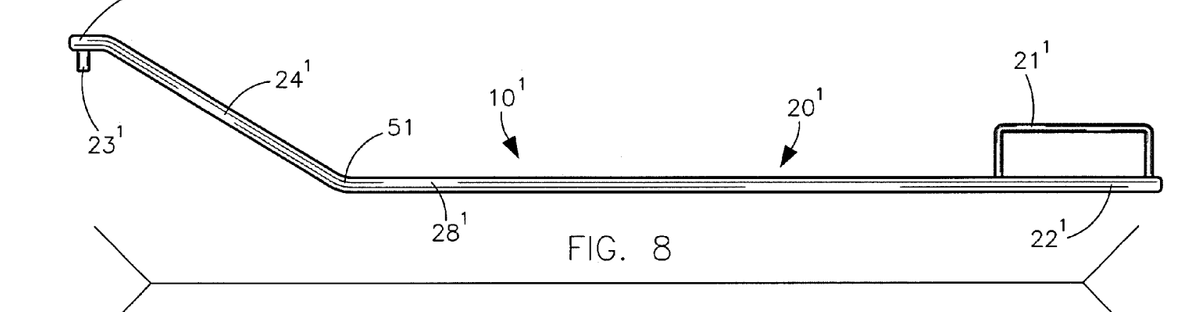
FIG. 8 is a side elevational view of the tire lifting apparatus, as seen in FIG. 7.
Figure 9:
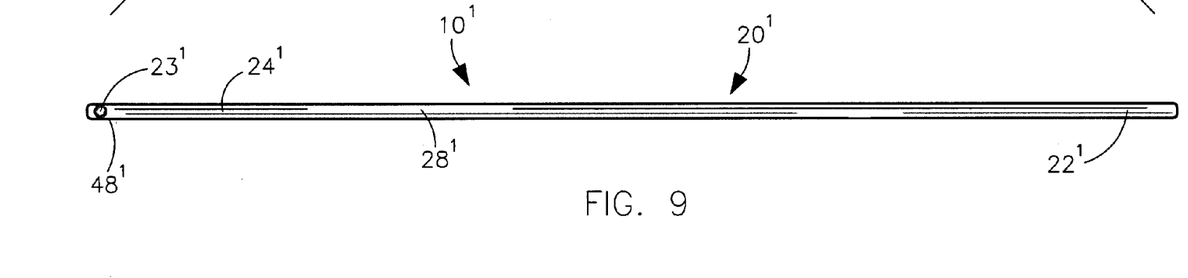
FIG. 9 is a bottom plan view of the tire lifting apparatus, as seen in FIG. 7.
Figure 10:
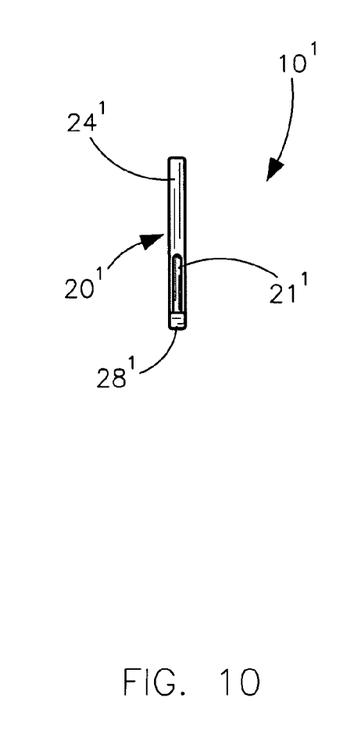
FIG. 10 is a front elevational view of the tire lifting apparatus, as seen in FIG. 7.
Figure 11:
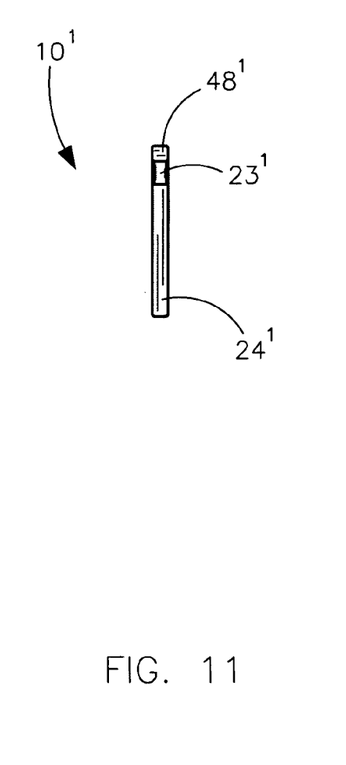
FIG. 11 is a rear elevational view of the tire lifting apparatus, as seen in FIG. 7.

The apparatus conveniently assists a user in maneuvering a wheel/tire 11, as may be needed for relocating or changing a wheel/tire 11, without causing increased strain on a user's back or joints. In use, as a user removes a wheel/tire from a vehicle, the user should simply situate the prong 23 in a center of the wheel/tire 11 and use the apparatus 10 as a lever by leaning the weight of the wheel/tire 11 against the arm 25 of the apparatus 10. Finally, a user need only use the apparatus 10 to move the wheel/tire 11 to the desired location. Thereafter, the wheel/tire 11 may be mended as needed, and the procedure would be repeated for replacing the wheel/tire 11 on an existing vehicle.

Now referring to FIGS. 7-13, an alternate embodiment 10' of the present invention shows the tire lifting apparatus 10' preferably including an elongated and non-linear shaft 20' having a handle 21' formed at a proximal end 22' thereof and further having a rectilinear prong 23' formed at a distal end 48' thereof. Prong 23' may be rectilinear and registered orthogonal to the distal end 48' of shaft 20'. A distal portion 24' of the shaft 20' is angularly offset from a remaining proximal portion 28' of shaft 20' and is intermediately positioned between the distal end 48' and the proximal portion 28' of the shaft 20'. Such an angularly offset distal portion 24' may be offset about 20-45 degrees from an axial plane of shaft 20'.

Figure 12:
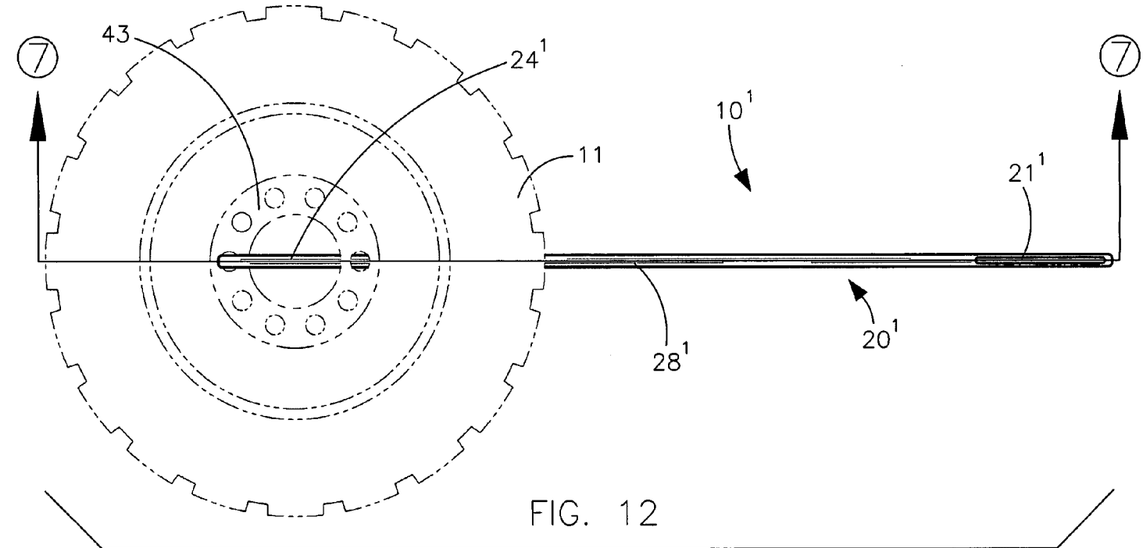
FIG. 12 is a side elevational view showing the tire lifting apparatus engaged with the hub of the wheel/tire.
Figure 13:
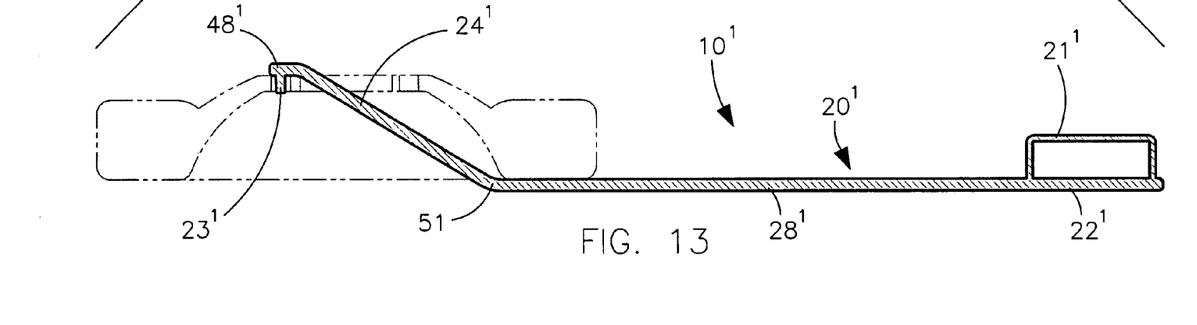
FIG. 13 is a cross-sectional view taken along line 7-7 in FIG. 6 showing the alternate embodiment properly situated within an existing wheel.

The longitudinal length of the distal portion 24' is suitably sized and shaped to extend across a hub cap 41 of the wheel/tire 11 such that a leading edge 51 of the distal portion 24' is contiguously positioned at an inner diameter of hub cap 41 and prong 23' becomes interfitted within an aperture of hub cap 43, which is oppositely situated from the leading edge 51. Such an arrangement advantageously distributes the weight of the wheel/tire 11 along the entire longitudinal length of the distal portion 24' for relieving the amount of force required to lift and transport the wheel/tire 11 between remote locations. The remaining proximal portion of shaft 20' extends along a bottom surface of the wheel/tire 11 for providing sufficient leverage and assisting the user to easily lift the wheel/tire 11 from a flat position.

The present invention further includes a method for lifting and supporting a tire. The method preferably includes the chronological steps of providing a tire lifting apparatus in accordance with the embodiments 10, 10', described hereinabove. The next steps may include removing the tire from a vehicle and laying the tire on a ground surface such that an outer circumferential face of the tire is directly engaged with the ground surface; sliding the distal portion of the shaft underneath the outer circumferential face of the tire; situating the prong into an aperture of a hub of the tire; and urging the outer circumferential face of the tire above the ground surface by grasping the handle and lifting the proximal end of shaft.

The tire lifting apparatus conveniently assists a user in maneuvering a wheel/tire 11, as may be needed for relocating or changing a wheel/tire 11, without causing increased strain on a user's back or joints. In use, as a user removes a wheel/tire from a vehicle, the user should simply situate the prong in a center of the wheel/tire 11 and use the apparatus 10 as a lever by leaning the weight of the wheel/tire 11 against the arm 25 of the apparatus 10. Finally, a user need only use the apparatus 10 to move the wheel/tire 11 to the desired location. Thereafter, the wheel/tire 11 may be mended as needed, and the procedure would be repeated for replacing the wheel/tire 11 on an existing vehicle.

The tire lifting apparatus 10, 10' may be comprised of steel, but may be comprised of other durable materials as is obvious to one skilled in the art. A preferred embodiment of the apparatus 10, 10' may measure 5 feet, 6½ inches in height, for example, but may be available in a variety of sizes to accommodate different types of wheels/tires. Unlike many prior art examples, the present invention provides the unexpected benefit of eliminating electrical parts or batteries. Therefore, the tire lifting apparatus is conveniently available for immediate use.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A method for lifting and supporting a tire, said method comprising the chronological steps of:

providing an elongated and rigid shaft having a handle directly and statically coupled to a proximal end thereof and further having a prong directly and statically coupled to a distal end thereof, said shaft further having a rectilinear proximal portion directly and statically coupled to said handle and axially extending away therefrom, said proximal portion being monolithically formed with said proximal end and said handle respectively, said shaft further having a rectilinear distal portion connected to said proximal portion as well as said distal end such that said distal portion is intermediately positioned between said proximal portion and said distal end respectively, said prong being axially offset from said distal end of said shaft such that said prong terminates at a first plane spaced apart from said distal end, said shaft having planar top and bottom surfaces;

removing the tire from a vehicle and laying the tire on a ground surface such that an outer circumferential face of the tire is directly engaged with the ground surface;

sliding said distal portion of said shaft underneath the outer circumferential face of the tire;

situating said prong into an aperture of a hub of the tire; and urging said outer circumferential face of the tire above the ground surface by grasping said handle and lifting said proximal end of shaft.

* * * * *